United States Patent [19]

Middleton et al.

[11] Patent Number: 5,605,052
[45] Date of Patent: Feb. 25, 1997

[54] MIST SPRAY SYSTEM FOR REFRIGERATION CONDENSERS

[76] Inventors: Stephen C. Middleton; Linda M. Middleton, both of 4303 Colt La., West Palm Beach, Fla. 33406

[21] Appl. No.: 418,368

[22] Filed: Apr. 7, 1995

[51] Int. Cl.⁶ .................................................. F28D 3/00
[52] U.S. Cl. .................................................. 62/171; 62/305
[58] Field of Search ........................... 62/305, 181, 183, 62/173, 171; 137/78.5, 78.1, 804; 256/4, 7

[56] References Cited

U.S. PATENT DOCUMENTS

| | | | |
|---|---|---|---|
| 4,170,117 | 10/1979 | Faxon | 62/183 |
| 4,240,265 | 12/1980 | Faxon | 62/171 |
| 4,274,266 | 6/1981 | Shires | 62/171 |
| 4,542,627 | 9/1985 | Welker | 62/171 |
| 4,685,308 | 8/1987 | Welker et al. | 62/171 |
| 5,117,644 | 6/1992 | Fought | 62/171 |
| 5,285,651 | 2/1994 | Marine | 62/171 |
| 5,311,747 | 5/1994 | Pringle et al. | 62/183 |

*Primary Examiner*—William Doerrler
*Attorney, Agent, or Firm*—David L. Baker; Rhodes & Ascolillo

[57] ABSTRACT

The invention is a mist spray system for refrigeration condensers and includes a water spray nozzle centrally affixed to the condenser grill for spraying a circular pattern of water on the condenser when operating. A paddle pivotally suspended over the condenser exhaust is connected to a control arm that functions as a pinch valve controlling the flow of water to the nozzles when the paddle is activated by the flow of exhaust air. Water into the system is pressure controlled, and travels through ¼ inch plastic tubing to the nozzles which are adjustable.

4 Claims, 4 Drawing Sheets

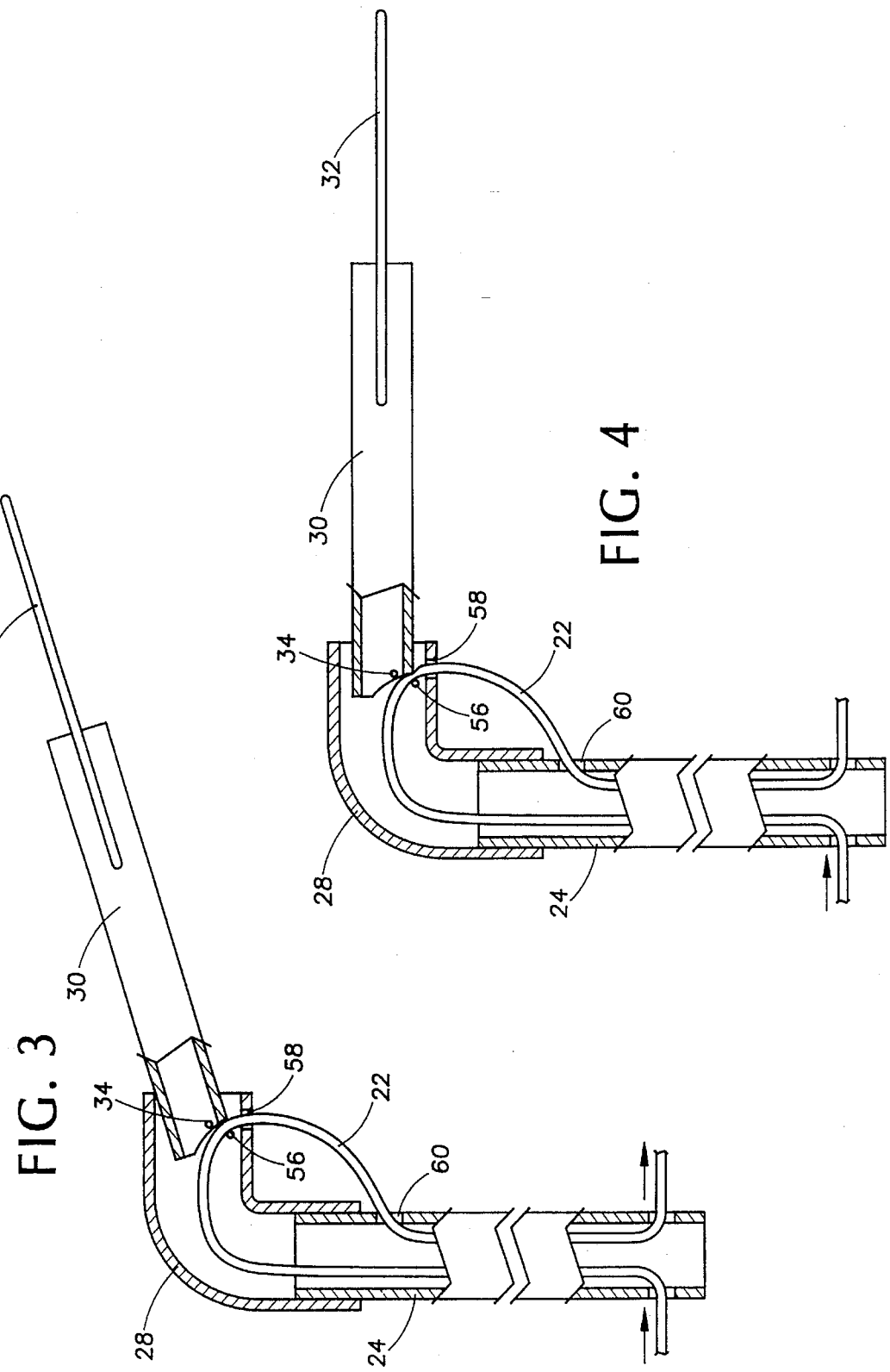

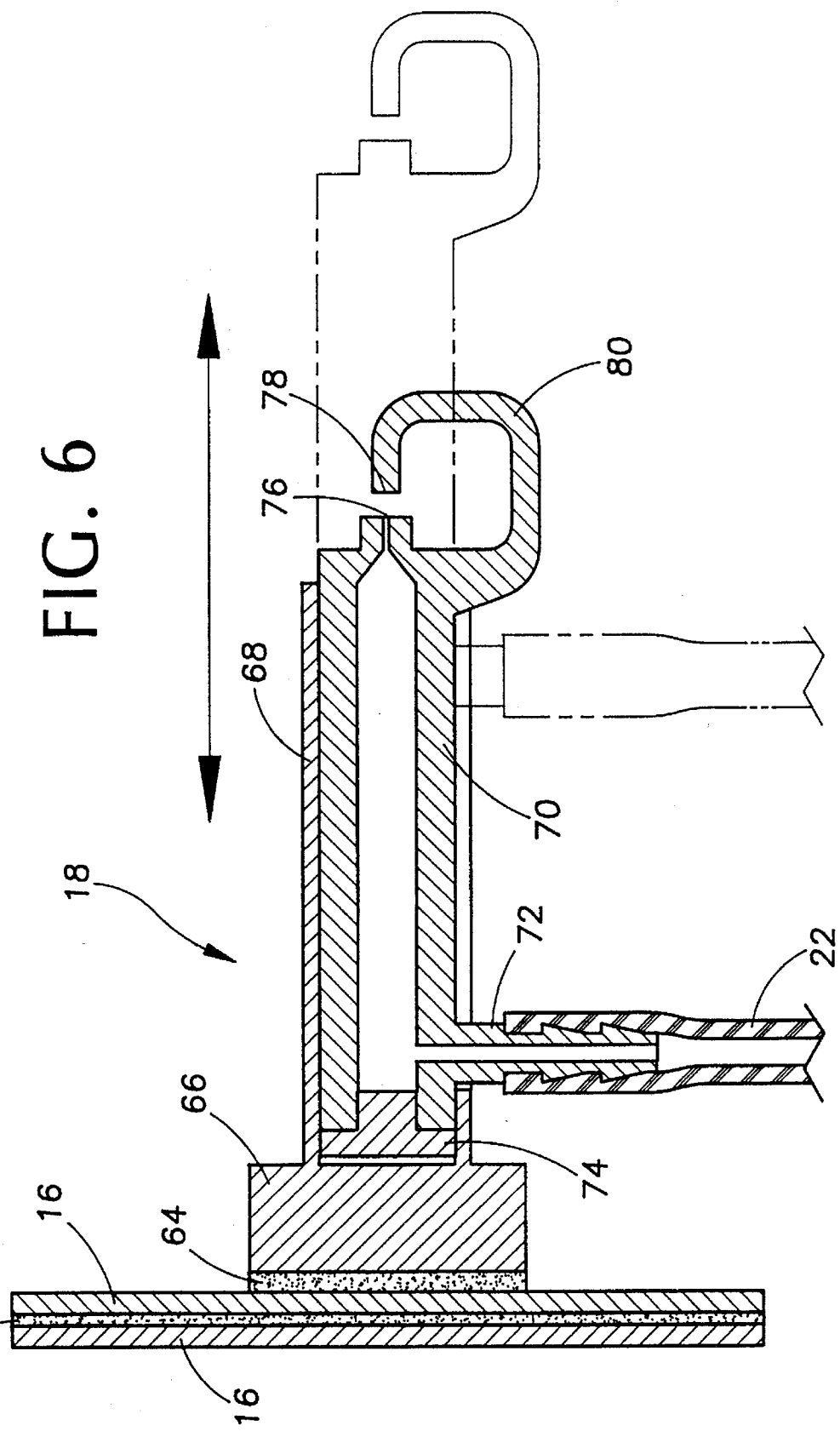

MIST SPRAY SYSTEM FOR REFRIGERATION CONDENSERS

BACKGROUND OF THE INVENTION

1. Field of the Invention

The invention relates generally to a system for spraying mist on a refrigeration system condenser coil and more particularly to a system that is simple and inexpensive to operate.

2. Brief Description of the Prior Art

The use of mist spray devices to improve the efficiency of air conditioning systems has been proposed by those routineers and observers of the art for some time. The practice has apparently proved to accomplish some objective in that the prior art is replete with suggestions on how to include a mist spray system with a conventional closed air conditioning system. In practice, the systems fail to appear in the market place despite the apparent need for more efficiency and lower operating costs.

Examples of U.S. Patents that disclose systems for spraying a mist into the condenser coil of an air conditioning system include two patents granted to Faxon, U.S. Pat. No. 4,170,117 issued Oct. 9, 1979 and U.S. Pat. No. 4,240,265 issued Dec. 23, 1980. The two disclosures show a spray nozzle (18) located some distance from a condenser 12 and suspended by a wire arrangement. A temperature sensor (60) feeds back to an electrical switch (48) which controls a water flow valve (40). When the temperature in the condenser reaches a predetermined point the switch is activated opening the valve and allowing the water to spray into the coils of the condenser. Another U.S. Patent describing a coil cooling apparatus has been granted to Fought, U.S. Pat. No. 5,117,644 issued on Jun. 2, 1992. This system is of a conventional spray mist type but is controlled by a vibration transducer that senses the vibration of the condenser as it operates and accordingly switches the cooling water on. This system is electrical and suggests the use of battery power for backup. U.S. Pat. No. 5,311,747 issued May 17, 1994 to Pringle et al. describes a water-assisted condenser cooler or the type described that uses a normally closed poppet valve for controlling the flow of water. Proximate to the valve stem is a temperature sensing bellows that expands as the temperature of the cooling air rises and urges the valve stem into the open position allowing cooling water to cool the coils in a conventional manner.

The prior art taken alone or in combination fails to anticipate the improved system for a mist spray system for condenser coils.

SUMMARY OF THE INVENTION

The invention is characterized by a simple, reliable, low cost system for providing a mist cooling system for air conditioning condensers. The system consists of an adapter containing a pressure regulator to limit the pressure in the system to 25 psi and to reduce the standard half inch domestic plumbing to ¼ inch plastic tubing. The tubing extends from a water supply outlet, up the interior of a ground staked mast and passes through a pinch valve which regulates the flow of water through the system. The pinch valve includes a pivoted control arm which extends over the air out flow of the condenser unit. At the end of the control arm is a paddle which reacts to the air flow through the condenser coils. As the condenser is activated the air exiting the condenser applies a force against the paddle, causing the control arm to rise and pivot about the pivot point moving away from the plastic tubing it had pinched closed. The water will then begin to flow through the plastic tubing contained within the interior of the mast and through the outlet tubing to the adjustable nozzles secured to the condenser grill. The nozzles provide a circular pattern of spray mist with an adjustable radius, making the system suitable for a wide variety of condensers without requiring a changing of parts. When the condenser shuts off, the fan stops, the paddle and control arm drop to the original position pinching off the water supply to the nozzles.

It is therefore an object of the invention to provide a new and improved mist spray apparatus for refrigeration system condensers.

It is another object of the invention to provide a new and improved mist spray apparatus that is simple and reliable.

It is a further object of the invention to provide a new and improved mist spray apparatus that is easily installed and requires little or no maintenance.

It is still another object of the invention to provide a new and improved mist spray apparatus that increases the efficiency of a sealed refrigeration system.

It is still a further object of the invention to provide a new and improved mist spray apparatus that is of a durable and reliable construction.

It is another object of the invention to provide a new and improved mist spray apparatus that uses readily available parts and is then susceptible of low prices of sale to the consuming public.

These, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view of the valve of the invention in the open position.

FIG. 4 is a cross sectional view of the valve of the invention in the closed position.

FIG. 6 is a cross sectional view of the nozzle of the invention.

DETAILED DESCRIPTION OF A PREFERRED EMBODIMENT

Figure 1:
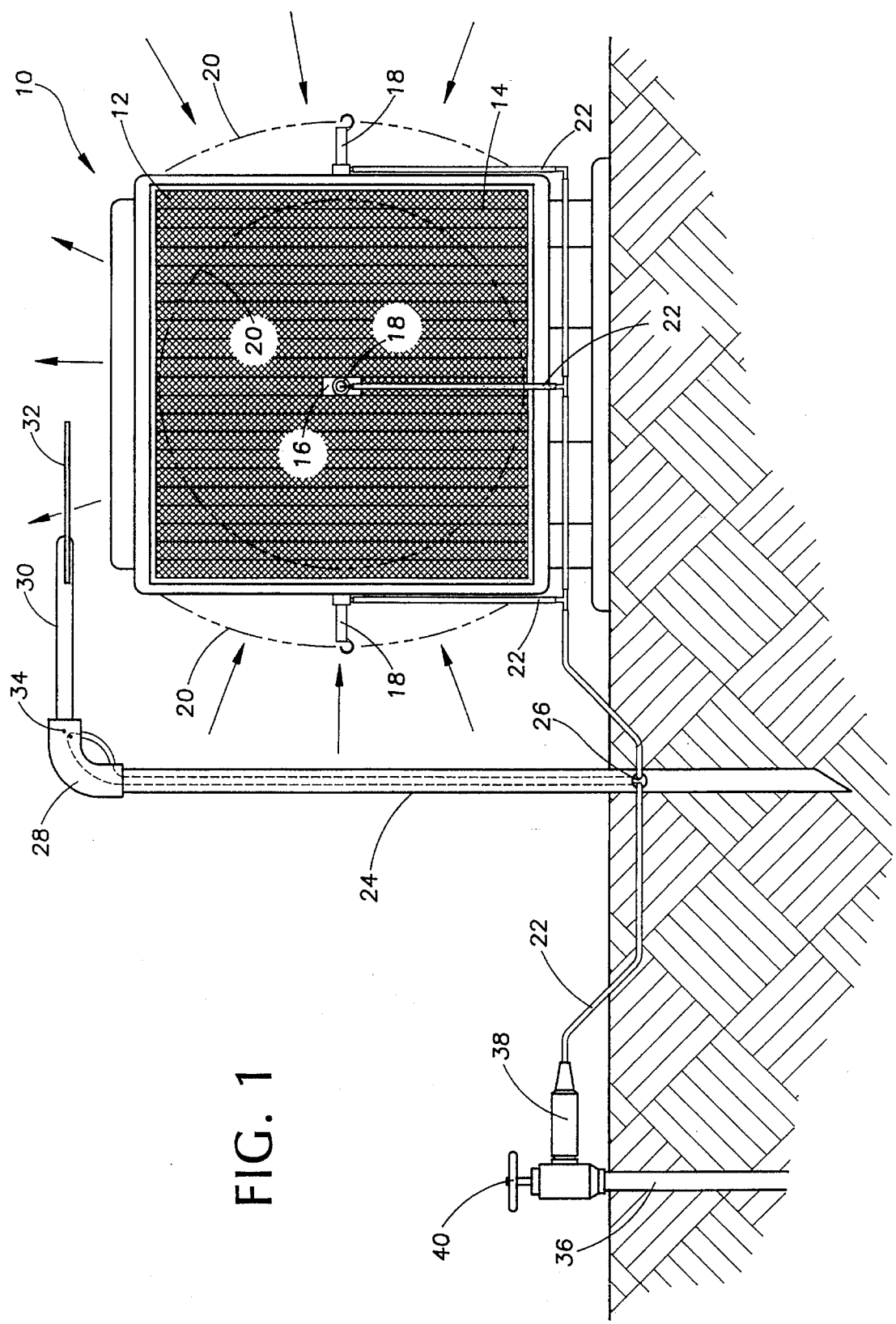
FIG. 1 is an environmental view of the mist spray system of the invention.

Referring now to FIG. 1, a typical refrigeration condenser is shown generally at 10. The condenser could be used in conjunction with an air conditioner or any other common and well known refrigeration evaporator units. Air enters the heat transfer coils 12 as shown by the horizontal arrows and is evacuated vertically by a fan located within the void that is formed by the walls of the coils for that purpose. The coils are protected from physical damage by a grill 14 formed from relatively wide spaced vertical rods that are designed not to inhibit the flow of air into the coils. Attached to the grill on each panel is a small attachment plate 16 shown in detail in FIG. 5. The plate is located centrally on each grill panel. Affixed to each plate 16 is a nozzle 18, shown in detail in FIG. 6. The nozzle is adjustable and designed to spray water in a circular pattern as shown by the lines 20. The nozzles are connected to a supply of water via ¼ inch plastic tubing 22.

The tubing 22 enters a mast 24 formed of PVC pipe or some other like material via aperture 26 and continues to the elbow 28 where it passes through the pinch valve as described with regard to FIGS. 3 and 4. A control arm 30 containing a paddle 32 pivots about a point 34 within the elbow 28 and acts to pinch the water supply line closing the line when the condenser is off. When the condenser is operating, air from the cooling fan strikes the paddle 32 and lifts the control arm allowing water to flow to the nozzles 18 placed outside the cooling coils on the protective grill. Water from a conventional water system 36 is filtered and pressure regulated in the unit 38 and further described with regard to FIG. 2. The entire system may be shut down by valve 40 in a known and conventional manner.

Figure 2:
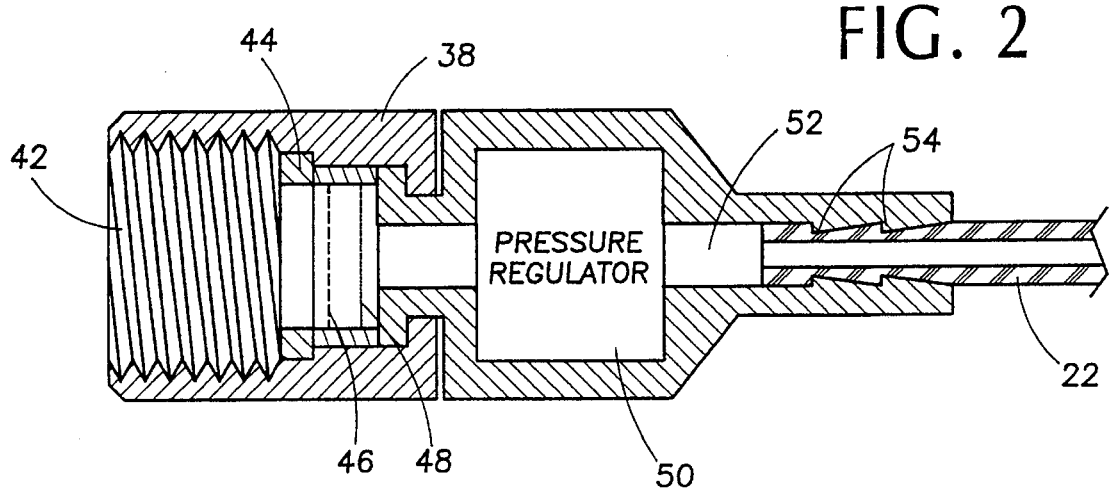
FIG. 2 is a cross sectional view of the adapter-regulator for the system.

Concerning FIG. 2, unit 38 consists of a body formed from PVC or other similar plastic material. The water inlet end contains a female threaded opening 42 that will fit the standard garden hose faucet. An annular washer 44 fits inside the opening next to a filter insert consisting of a coarse screen 46 and a fine screen 48. A conventional pressure regulator 50 is located down stream from the filter and limits the water pressure to 25 psi. The outlet of unit 38 is reduced in diameter and accepts ¼ inch plastic tubing 22 which is inserted into the outlet aperture 52. The outlet is provided with annular internal ridges 54 which grasp and secure the tubing in place.

Referring to FIGS. 3 and 4, the plastic tubing 22 is seen inside the mast 24 which is foreshortened for illustrative purposes. The elbow 28 at the top of the mast supports the control arm 30 containing paddle 32. A pivot point is shown at 34. In the figures tubing 22 rests on support pin 56 before it leaves the elbow via aperture 58 and reenters the mast through aperture 60. When the condenser is in the off condition, control arm 30 rests against the plastic tubing 22 at a point where it crosses the support pin 56 (See FIG. 4). The weight of the control arm against the support pin 56 pinches the tube blocking the flow of water to the nozzles 18. Air rising from the condenser fan lifts the paddle 32 and the control arm from the tubing and the water will then be free to flow to the nozzles 18 (See FIG. 3).

Figure 5:
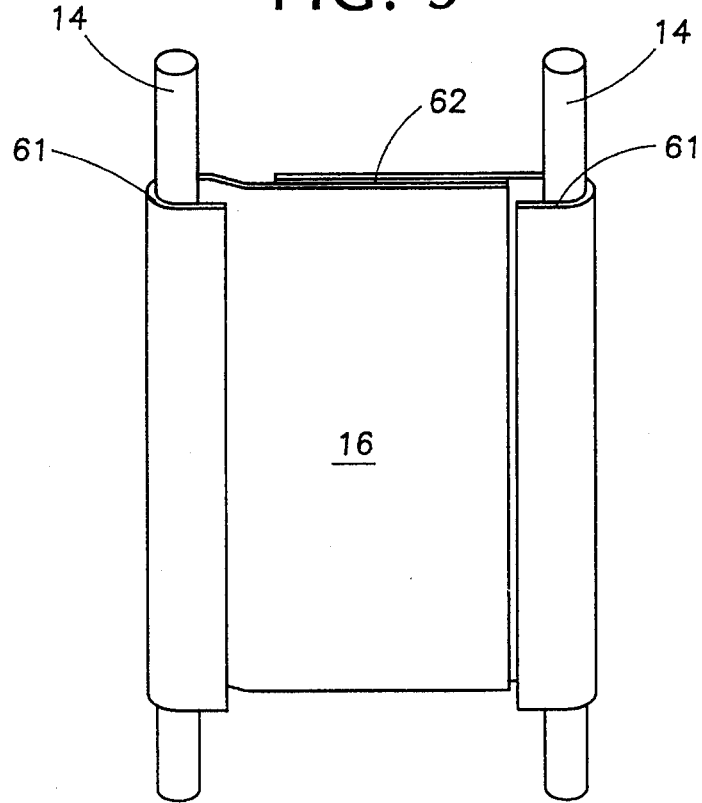
FIG. 5 is a perspective view of the mounting plate for the nozzle of the invention.

The nozzle attachment plate 16 is shown in FIG. 5. The plate is formed of two pieces that grasp the grill rods 14. Each piece includes an arcuate edge 61 that is attached to a grill rod 14. The plates are then joined by an adhesive layer 62. The plates are a one time permanent installation. The nozzle is affixed to the center of the plate in a manner as shown in FIG. 6. An adhesive disk 64 holds the base of the nozzle 66 to the plate 16. A sleeve 68 provides a support housing for the nozzle body 70. Water enters the nozzle via plastic tube 22 and extension 72. A plug 74 seals one end of the nozzle body while an aperture 76 allows the water to strike the end 78 of the C shaped member 80 and reflects water back to the cooling coils in the pattern 20 shown in FIG. 1. Changing the shape of end 78 will change the pattern of the mist striking the coils. As shown in phantom, the nozzle is capable of sliding in and out to increase or decrease the coverage area of the mist.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. An improved mist spray system for refrigeration condensers comprising:

a means for applying a fluid mist spray to the coils of a refrigeration condenser comprising an adjustable spray nozzle;

means for affixing the means for applying to the coils of a refrigeration condenser system;

valve means for controlling the flow of fluid to the means for applying the fluid;

the valve means comprising;

a pinch valve that closes and opens said tubing; and a mast housing a portion of the pinch valve;

means for controlling said valve means by causing the valve to allow fluid flow only during the operation of the condenser;

means for controlling the quantity and pressure of fluid flow to the said valve comprising:

a pressure reducer, a filter member; and a tubing size reducer;

flexible tubing for connecting the elements of the system; and the pinch valve comprising:

a pivoting control arm;

a pivot point member pivotally connecting the control arm to the mast;

a pinch end on the control arm proximate the pivot point member;

a paddle, connected to another end of the control arm, distal the pivot point member;

said paddle extending over the condenser exhaust air vent;

a flow of air against the paddle operatively pivoting the control arm from a closed position to an open position;

the pinch end of the control arm pinching the flexible tubing end against a support pin and restricting a flow of fluid through the flexible tubing when the control arm is in the closed position; and the pinch end of the control arm allowing flow of the fluid through the flexible tubing when the control arm is in the open position.

2. An improved mist spray system according to claim 1 wherein the means for affixing includes a plate secured to the condenser grill.

3. An improved mist spray system according to claim 2 wherein the spray nozzle is affixed to the plate by an adhesive.

4. An improved mist spray system according to claim 1 wherein a spray pattern of the adjustable spray nozzle is circular.

\* \* \* \* \*